April 22, 1958  R. A. RICHARDSON  2,831,650
VALVE ASSEMBLY
Filed April 26, 1954
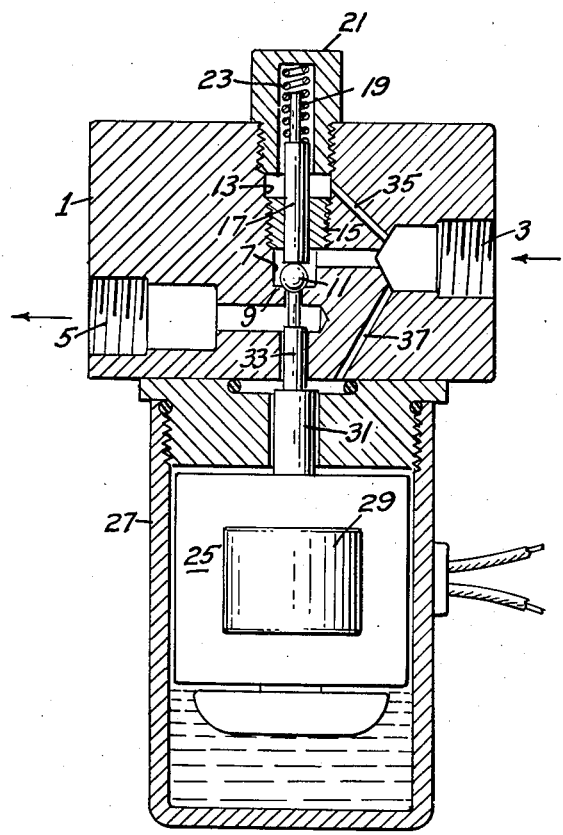
INVENTOR.
ROLLAND A. RICHARDSON
BY
Bruce + Brosler
HIS ATTORNEYS

United States Patent Office 2,831,650
Patented Apr. 22, 1958

2,831,650

VALVE ASSEMBLY

Rolland A. Richardson, Alameda, Calif., assignor to Pacific Industrial Manufacturing Co., a corporation of California Application April 26, 1954, Serial No. 425,528

5 Claims. (Cl. 251—129)

My invention relates to valve assemblies and more particularly to a valve assembly for controlling flow in a hydraulic line.

Among the objects of my invention are:

(1) To provide a novel and improved valve assembly;

(2) To provide a novel and improved valve assembly for controlling flow in a hydraulic line;

(3) To provide a novel and improved flow control valve assembly of simple and rugged construction;

(4) To provide a novel and improved flow control valve assembly which is balanced as to hydraulic pressures;

(5) To provide a novel and improved control valve assembly of the ball valve type;

(6) To provide a novel and improved flow control valve assembly of the ball valve type in which hydraulic pressures are balanced;

(7) To provide a novel and improved flow control valve assembly which is devoid of moving seals;

(8) To provide a novel and improved solenoid operated valve assembly;

(9) To provide a novel and improved solenoid operated valve assembly in which pounding of the solenoid is dampened to increase the life of such valve assembly.

Additional objects of my invention will be brought out in the following description of a preferred embodiment of the same, taken in conjunction with the accompanying drawing, wherein:

The figure is a view in section through a valve assembly embodying the features of the present invention.

Referring to the drawing for details of my invention in its preferred form, the valve assembly depicted therein comprises a valve housing 1 in the form of a block, preferably of metal, having an in-flow passage 3 and an out-flow passage 5, the out-flow passage being preferably offset with respect to and connecting with the in-flow passage by a short valve passage 7 in which a valve seat 9 is formed to receive a ball valve 11 on the in-flow side.

This ball valve is normally held seated under spring pressure. This is arranged for by providing a large bore 13 in the upper end of the housing to a depth sufficient to intersect the in-flow passage 3 just above the valve. At the lower end of this bore there is threadily disposed a guide plug 15 having a central passage therethrough to slidably receive and guide a plunger 17 having a stem 19 extended upwardly therefrom. This stem and the upper end of the plunger are enclosed within a small cylinder 21 threadedly secured in the end of the bore 13 with a coil spring 23 held therein under compression against the plunger.

The ball valve is capable of being unseated from below by any appropriate means, in this case by an electrically energizable solenoid 25. Such solenoid includes a casing 27 affixed to the valve housing and enclosing a solenoid winding 29 supported therein, and a solenoid plunger 31 extending therefrom in the direction of the seated side of the flow valve.

Intermediate the solenoid plunger and the ball valve and axially aligned therewith, is a valve unseating plunger 33 slidably supported in the housing, the length of the unseating plunger being just sufficient to extend between the solenoid plunger and the seated valve when the solenoid is in its de-energized condition. When energized, the upward kick of the solenoid plunger will, obviously, force the ball valve off its seat against the compressive force of the spring, which will serve to absorb the thrust of the solenoid plunger.

In the preferred embodiment of the valve assembly of the present invention, all hydraulic forces are balanced so that the operation of the valve assembly will be substantially independent of any hydraulic pressures existing in the system in which the valve assembly is located.

To accomplish this result, a bore 35 is provided in the valve housing leading from the in-flow passage to the mouth of the cylinder, while a similar bore 37 in the valve housing leads from the in-flow passage to the solenoid. Thus, the hydraulic fluid, which in a hydraulic control system would, in all probability, be oil, will gain access to all spaces and passages in the valve assembly on both sides of the valve thereby equalizing hydraulic pressures within the valve assembly. The valve assembly, therefore, can function substantially independent of any pressures existing in the hydraulic lines. The presence of such hydraulic fluid also maintains all movable parts under constant lubrication.

A further advantage derived from the situation resides in the fact that the hydraulic fluid will serve to dampen the pounding of the solenoid plunger, thus increasing the life expectancy of the valve assembly.

While the form of the invention illustrated for purposes of description involved a normally closed valve assembly, it is apparent that the illustrated embodiment can be converted to a normally open valve assembly by utilizing a solenoid with a spring under compression between the bottom of the solenoid casing and the lower end of the solenoid plunger, and of sufficient compressive force to lift the ball off its seat against the restoring force of the spring 19. When energized, the solenoid will pull the plunger down to permit seating of the ball. In such modified assembly, the features of the invention are retained.

It is noted that the valve assembly described is relatively simple and rugged, and that in such assembly, there are no moving seals. The assembly, therefore, becomes very effective and efficient in operation, regardless of hydraulic pressures developed in the system in which the valve assembly is located.

From the foregoing description of the invention, in its preferred form, it will be apparent that the same fulfills all of the objects attributed thereto and while the same has been illustrated and disclosed in its preferred form and in considerable detail, it is capable of alteration and modification without departing from the underlying principles involved. I accordingly do not wish to be limited in my protection to such details except as may be necessitated by the appended claims.

I claim:

1. A valve assembly comprising a valve housing having an in-flow passage and an outflow passage connecting with said in-flow passage; a valve seat between said in-flow passage and said out-flow passage; a valve on the in-flow side of said valve seat; means normally exerting pressure against said valve in the direction of seating the same; means for unseating said valve against the compressive force of said pressure exerting means; and means for substantially balancing hydraulic pressures throughout the valve assembly, said means including a bore in said valve housing leading from said in-flow passage to said pressure exerting means, and a bore in said housing leading from said in-flow passage to said valve unseating means.

2. A valve assembly comprising a valve housing having an in-flow passage and an out-flow passage connecting with said in-flow passage; a valve seat between said in-flow passage and said outflow passage; a valve on the in-flow side of said valve seat; resilient means normally exerting pressure against said valve in the direction of seating the same; means for unseating said valve against the compressive force of said resilient means, said means including a solenoid casing affixed to said valve housing, a solenoid winding supported in said casing and a solenoid plunger extending therefrom in the direction of the seated side of said valve, and an unseating plunger slidably mounted in said valve housing and extending from said solenoid plunger to said valve in its seated position when said solenoid winding is de-energized; and means for substantially balancing hydraulic pressures throughout the valve assembly.

3. A valve assembly comprising a valve housing having an in-flow passage and an outflow passage connecting with said in-flow passage; a valve seat between said in-flow passage and said outflow passage; a ball valve on the in-flow side of said valve seat; means normally exerting pressure against said ball valve in the direction of seating the same, said means including a cylinder in said valve housing, a compression spring in said cylinder and a plunger having one end in contact with said ball valve and its other end in said cylinder under pressure of said spring; means for unseating said ball valve against the compressive force of said spring, said means including a solenoid casing affixed to said valve housing, a solenoid winding supported in said casing and a solenoid plunger extending therefrom in the direction of the seated side of said ball valve, and an unseating plunger slidably mounted in said valve housing and extending from said solenoid plunger to said ball valve in its seated position when said solenoid winding is de-energized; and means for substantially balancing hydraulic pressures throughout the valve assembly, said means including a bore in said valve housing leading from said in-flow passage to said cylinder, and a bore in said housing leading from said in-flow passage to said solenoid.

4. A valve assembly comprising a valve housing having an in-flow passage and an outflow passage offset with respect to and connecting with said in-flow passage by a valve passage; a valve seat in said valve passage; a ball valve on the in-flow side of said valve seat; means normally exerting pressure against said ball valve in the direction of seating the same, said means including a cylinder in said valve housing a compression spring in said cylinder and a plunger having one end in contact with said ball valve and its other end in said cylinder under pressure of said spring; means for unseating said ball valve against the compressive force of said spring; and means for substantially balancing hydraulic pressures throughout the valve assembly, said means including a bore in said valve housing leading from said inflow passage to said cylinder, and a bore in said housing leading from said in-flow passage to said valve unseating means.

5. A valve assembly comprising a valve housing having an in-flow passage and an out-flow passage offset with respect to and connecting with said in-flow passage by a valve passage; a valve seat in said valve passage; a ball valve on the in-flow side of said valve seat; means normally exerting pressure against said ball valve in the direction of seating the same, said means including a cylinder in said valve housing, a compression spring in said cylinder and a plunger having one end in contact with said ball valve and its other end in said cylinder under pressure of said spring; means for unseating said ball valve against the compressive force of said spring, said means including a solenoid casing affixed to said valve housing, a solenoid winding supported in said casing and a solenoid plunger extending therefrom in the direction of the seated side of said ball valve, and an unseating plunger slidably mounted in said valve housing and extending from said solenoid plunger to said ball valve in its seated position when said solenoid winding is de-energized; and means for substantially balancing hydraulic pressures throughout the valve assembly, said means including a bore in said valve housing leading from said in-flow passage to said cylinder, and a bore in said housing leading from said in-flow passage to said solenoid.

References Cited in the file of this patent

UNITED STATES PATENTS

| | | |
|---|---|---|
| 1,411,717 | Frost | Apr. 4, 1922 |
| 2,114,961 | Gille | Apr. 19, 1938 |
| 2,371,351 | Paille | Mar. 13, 1945 |
| 2,797,061 | Buchanan | June 25, 1957 |